US006038223A

United States Patent [19]

Hansson et al.

[11] Patent Number: 6,038,223

[45] Date of Patent: Mar. 14, 2000

[54] ACCESS SCHEME FOR PACKET DATA IN A DIGITAL CELLULAR COMMUNICATION SYSTEM

[75] Inventors: Rolf Hansson, Kungsängen; Anders Herlitz, Älta; Lars Frid, Stockholm, all of Sweden

[73] Assignee: Telefonaktiebolaget LM Ericsson (publ), Stockholm, Sweden

[21] Appl. No.: 08/955,664

[22] Filed: Oct. 22, 1997

[51] Int. Cl.[7] ................................ H04Q 7/00; H04J 3/16; H04B 7/212

[52] U.S. Cl. .......................... 370/329; 370/328; 370/346; 370/347

[58] Field of Search .................................... 370/347, 348, 370/349, 458, 449, 230, 235, 236, 252, 329, 328, 340

[56] References Cited

U.S. PATENT DOCUMENTS

| | | | |
|---|---|---|---|
| 4,135,059 | 1/1979 | Schmidt . | |
| 4,201,892 | 5/1980 | Schmidt . | |
| 4,504,946 | 3/1985 | Raychaudhuri . | |
| 4,654,867 | 3/1987 | Labedz et al. . | |
| 4,742,512 | 5/1988 | Akashi et al. . | |
| 5,278,833 | 1/1994 | Crisler et al. . | |
| 5,313,461 | 5/1994 | Ahl et al. . | |
| 5,319,634 | 6/1994 | Bartholomew et al. . | |
| 5,361,399 | 11/1994 | Linquist | 455/412 |
| 5,412,659 | 5/1995 | Fujita | 370/337 |
| 5,537,399 | 7/1996 | Du . | |
| 5,590,133 | 12/1996 | Billstrom et al. . | |
| 5,603,081 | 2/1997 | Raith et al. . | |
| 5,604,744 | 2/1997 | Andersson | 370/347 |
| 5,640,395 | 6/1997 | Hamalainen | 370/322 |
| 5,673,259 | 9/1997 | Quick | 370/342 |
| 5,701,298 | 12/1997 | Diachina | 370/346 |
| 5,729,541 | 3/1998 | Hamalainen | 370/337 |

FOREIGN PATENT DOCUMENTS

| | | |
|---|---|---|
| 0 642 283 A2 | 3/1995 | European Pat. Off. . |
| 2 295 523 | 5/1996 | United Kingdom . |

OTHER PUBLICATIONS

Mouly, Michel, Pautet, Marie–Bernadette: "*GSM System for Mobile Communications*", Sep. 2, 1993, Europe Media, Lassay–Les–Chateaux, pp. 186–193, 206–211, 366–373, 424–427.

Tanenbaum, A.S.: "*Computer Networks*" 1993, Prentice––Hall International Editions, Englewood Cliffs, pp. 110–111.

*Primary Examiner*—Ajit Patel
*Assistant Examiner*—Ricardo M. Pizarro
*Attorney, Agent, or Firm*—Jenkens & Gilchrist, P.C.

[57] ABSTRACT

A new access scheme for a digital radio network for providing packet data access to mobile stations operating within said network. A random access channel (ACH) is provided for control signaling and short data messages between the network and the mobile stations. One or more polling data channels (PDCHs) are provided for larger quantities of data to be sent between the mobile stations and the network. A mobile station seeking access to send data packets contacts the network over the ACH channel, registers for packet access and is assigned a unique flag pattern. The network then sequentially provides to various registered mobiles access to a PDCH channel by sending its flag pattern in a message over the downlink PDCH. When each mobile recognizes its own unique flag pattern it knows that it is then allowed to send a discrete number of packet bursts to the network over the uplink PDCH before access to the PDCH is given to another registered mobile station. This procedure provides shared access to the PDCH channel to each of the mobiles in the network and prevents collisions between the packets of different mobile stations.

20 Claims, 4 Drawing Sheets

ACCESS SCHEME FOR PACKET DATA IN A DIGITAL CELLULAR COMMUNICATION SYSTEM

CROSS REFERENCE TO RELATED APPLICATIONS

This application is related to U.S. patent application Ser. No. 08/956,073, filed on even date herewith in the name of the same inventors and entitled "Allowing Several Multiple Access Schemes for Packet Data in a Digital Cellular Communication System" which is hereby incorporated by reference herein.

BACKGROUND OF THE INVENTION

1. Field of the Invention

The present invention relates to radio telecommunications and, more particularly, to a packet data telecommunication system for a cellular radio system network.

2. Description of the Related Art

In radio telecommunications, such as cellular radio systems, digital modulation schemes, such as time division multiple access (TDMA), are used to transmit both control information and voice traffic over the radio network. In addition, in recent years the transmission of data between computers and other data processing devices over the radio network is increasingly common. One technique which is used for the handling of data traffic over the radio network is circuit switched data services in which a dedicated circuit between a transmitting and a receiving station conveys the data from one to the other. An attractive alternative to such circuit switched data services for operators of mobile telephony networks are packet data services. The use of packet data switching enables several mobile users to share the available channel capacity within the system. This technique is well suited to modern data communication applications since data transmissions are usually of a bursty nature and thus do not continuously require a dedicated communications circuit.

A number of different channel access schemes are commonly used in radio communication systems. Each such access scheme has distinct advantages and disadvantages for various applications. For example, fixed assignment access schemes within a radio telecommunications system are used for circuit switched services such as conventional voice telephony and fax. Although not yet widely used in cellular systems, polling schemes may also be employed to enhance the frequency efficiency of a radio system. The most common scheme used for multiple access in a radio system are random access schemes, conventionally employed in many cellular radio telecommunications systems.

In conventional mobile packet radio communication systems, a base station (BS) communicates with a plurality of mobile stations (MSs) over one or more shared packet radio channels. Downlink packet traffic is scheduled by the base station, so that downlink contention between mobile stations is avoided. However, in order for the mobile stations to gain access to the base station on the uplink, they must compete using a random multiple access protocol which inevitably leads to contention and multiple collisions between the different mobile stations which are competing with one another for access on the uplink. Referring to FIG. 1, there is shown a simplified block diagram of a radio communications system which includes facilities for transferring packet data to and from a mobile station. The system 10 includes a communication network 12 which includes a base station/transceiver section 14. The network 12 can be a public land mobile network (PLMN) such as the Personal (formerly, Pacific) Digital Cellular (PDC) system, a digital TDMA cellular radio network.

Network 12 communicates with a mobile station 16 which has the capacity of sending and receiving packet data, via a base station 14 using existing air interface and switching communication protocols. The network 12 also communicates with other mobile stations 20 via a second base station 18 in the network 12, fixed telephones 22 in a public switch telephone network (PSTN), and terminal work stations 24 and 26. As shown, the communication between computer terminal 24 and network 12 are made over a wired line connection. The communication between computer terminal 26 and the network 12 are via a wireless radio connection through base station 14. Consequently, communications to and from phone 22 and computer terminals 24 and 26 can be routed to and from the mobile stations 20 and 16 by means of a network 12.

Referring next to FIG. 2, there is shown the channel structure of an illustrative air interface in a cellular radio system of the type illustrated in FIG. 1 which accommodates random access packet data channel. The channel structure includes a broadcast channel (BCCH) which is used by the network to broadcast various information to mobile stations such as channel allocation and system information. A set of common control channels (CCCH), including a paging channel (PCH) and a single cell signaling channel (SCCH) are used for transmitting signal information. The PCH is used to page a mobile station while the SCCH is used for transmitting information between the network and the mobile units, for example, requests by a mobile seeking access to the network. The uplink channel of the SCCH is of the random access type. A user packet channel (UPCH) is a channel which is available to multiple users for the transmission of user packet data. The uplink channel of the UPCH is also a random access type.

The appended control channels (ACCH) comprise an auxiliary channel appended to the traffic channel (TCH) for transmitting signal information between the network and the mobile station. The ACCH is further divided into the slow appended control channel (SACCH) which comprises a data channel carrying continuous system administration information such as measurement reports from each mobile of received signal strength measurements obtained for both its presently serving cell and adjacent cells. The fast appended control channel (FACCH) is also appended to a TCH and is a channel which temporarily steals the TCH to perform high speed transmissions. A housekeeping channel (RCH) sometimes replaces the SACCH and is used for transmitting maintenance information on the radio channel. Finally, the traffic channel (TCH) is used for transferring encoded speech and circuit switched user data. It is often further divided into full rate TCH and a half rate TCH for encoded speech.

It is conventional today to use the random access method for uplinking data transfer from a mobile station on the user packet channel (UPCH). The channel structure of the cell is communicated to the mobile users within that cell through the information transmitted on the broadcast channel (BCCH). For example, in the PDC system there is broadcast on the BCCH (and on other channels from time to time) a broadcast information message which contains numerous mandatory and optional parameters, including packet channel structure information and channel restriction information. The latter comprises one octet of data of which a small number of the possible 256 bit combinations are used to indicate to the mobile whether or not particular channels are restricted from access by those mobiles.

In accordance with conventional random access procedures, as soon as the user packet data channel (UPCH) is idle, all mobile users which want to send user data packets to the network will simultaneously compete for the use of that channel. If there is only one access during this competition phase, that user will get hold of the channel and remain its user until the complete data packet has been sent. During the time when the user utilizes the channel, no other mobile seeking to transmit a data packet will try to access it. However, if during the competition phase there is more than one user which simultaneously accesses the channel, a collision occurs and a maximum of one, or often none of those competing users, will get data through the channel. In such cases, each failing user must wait a random time period before it can make a new attempt to seize the channel.

The use of shared random access data channels in conventional packet services within radio networks has numerous disadvantages. For example, during high traffic loads and long packet messages, the probability of a mobile station being able to send its data packets is dramatically reduced and a mobile must wait an inordinately long period of time for the channel to become free so that it can even attempt to access it.

As illustrated in FIG. 3, each of the two mobile stations 31 and 32, equipped respectively for handling packet data from two portable computers 31*a* and 32*a* receive information broadcast on the downlink of the air interface, 33 and 34 respectively. Each mobile 31 and 32 receives the same information 35 broadcast on the BCCH. If both of the mobile stations 31 and 32 seek to send packet data to the network, they both listen for information on the BCCH indicating the availability of a random access user data channel (UPCH). An algorithm which uses the mobile's own unique identity (MSI) as one input parameter attempts to spread the mobiles evenly over the available channels. We assume each of the two mobiles 31 and 32 find the same UPCH 38 when applying the algorithm. If their respective access data packets 36 and 37 do not collide and obliterate one another when received at the base station, the packets are successfully delivered to the network. If, instead, two user packets 36 and 37 collide, then it is likely that neither of the two mobile stations 31 or 32 succeeds to access the channel and both must wait a random period of time before it make a new attempt to access the channel. The random access control process in a digital mobile radio communication system of the PDC type illustrated in FIGS. 1 and 3, is shown in FIG. 5.

Once a mobile successfully has started to send a packet it will continue to complete that packet. Each packet transfer is done under competition with other mobiles. FIG. 4 illustrates the layer 1 view of an uplink access scheme if we assume MS1 "has" the channel.

It is obvious that the more MSs that the algorithms allot to the same UPCH, the higher the risk of colliding packets.

In FIG. 5, the downlink user packet channel UPCH, and signaling channel SCCH, include a collision control field 41. This field is labeled E and, in this example, is 22 bits in length. This information is used by the mobile station during random access. Processing of the collision control bit field E at the base station comprises the processing of several sub-fields including the setting of an I/B field 42 to the bits "111" if the uplink UPCH is idle and to "000" if the uplink UPCH is busy. An R/N field 43 is set by the base station to "111" if valid information was received on the UPCH channel in the previous slot and to "000" if no valid information was received on the UPCH channel in the previous slot. The PE field 44 is set to all zeros if the channel is idle or no message was received. If a message is received on the UPCH channel, the detected and checked (CRC) (16 bits) from the UPCH message received from the mobile station are used as a partial echo in the PE field 44 in the downlink transmission.

With respect to processing of the packet data information in the mobile station, when the mobile station has data to send, it sequentially checks UPCH channels for an idle condition and starts the transmission. Next it looks for the R/N and PE fields to confirm that the first packet unit was correctly received by the base station. If this did not occur, the mobile station will, after a random delay, look again for an idle UPCH channel and try to retransmit its packet.

Referring next to FIG. 6, an example of random access control between two mobile stations in an illustrative digital cellular system of the PDC type is illustrated. In this example, two mobile stations MS1 and MS2 each have a packet to transmit to the network. The packets both consist of two bursts on the UPCH channel. The sequence of events corresponds to the sequence circled numbers in FIG. 6. First, the uplink UPCH is idle, which is indicated by the E field on the downlink UPCH, and thus both mobiles start transmission of their packets. Second, the base station is able to receive the packet burst from MS2 uncorrupted and responds accordingly by setting the following indications in the E field on the downlink: I/B field: B=B (busy); and R/N field: =R (burst received); and PE field: the CRC value from the burst received from MS2. Thirdly, MS2 detects that the PE field contains the CRC from the burst it has transmitted, which together with the appropriate B and R indications tell this mobile station to continue transmitting its packet. MS1, since it lost the contention with MS2, will inhibit all transmissions for a random time and then start searching for an indication that the channel becomes idle again. In the fourth step, when mobile station MS2 has completed its transmission the channel will again be marked idle and, in this example, MS1 starts transmission of its packet. At 5, MS1 receives an indication that its first burst was correctly received.

From these illustrations, it can be seen how a mobile station, seeking random access within the system encounters substantial difficulty in obtaining use of the packet data channel when either a great deal of packet traffic is present in the network or the packets being sent by the packet channel user are lengthy and therefore occupy the channel for extended periods of time.

Thus, there exists a need for an alternative access scheme within such radio telecommunication networks which enhance the packet data access by users within the system.

BRIEF SUMMARY OF THE INVENTION

In one aspect, the present invention provides a packet data access scheme in a digital cellular communications network which includes a broadcast control channel (BCCH) over which the network broadcasts control information to mobile stations in the network. A random access channel (ACH) is provided over which the network communicates only control signaling and short data messages between mobile stations and the network. At least one polling data channel (PDCH) enables the network to communicate larger quantities of packet data between a mobile station and the network. Messages are broadcast over the control channel (BCCH) which indicate the presence and operative parameters of the random access and polling channels to the mobile stations. A data registration signal is sent to the network from a mobile station on the ACH channel to indicate that the mobile station has data to send to the networks and the network allocates at least one PDCH channel to the registering mobile to allow it to send its data to the network. In one embodiment, control information is broadcast over the downlink PDCH which includes a control flag pattern which indicates which specific registered mobile station is allowed to send data over the uplink PDCH at that time.

In another aspect, the present invention provides a packet data access scheme for use in a digital cellular communications network which includes a broadcast control channel (BCCH) over which the network broadcasts control information to mobile stations in the network. A random access channel (ACH) is provided over which the network communicates only control signaling and short data messages between mobile stations and the network. At least one polling data channel (PDCH) enables the network to communicate larger quantities of data between a mobile station and the network. Messages are broadcast over the control channel (BCCH) which indicate the presence and operative parameters of the random access and polling channels to the mobile stations. A message is sent on the ACH channel allocating a PDCH channel message from the network to a selected mobile to indicate that the network has data to send to the mobile. A channel allocation acknowledgment is then sent on the PDCH channel from the mobile station to the network indicating that the mobile is ready to receive data from the network. At least one PDCH channel is allocated to allow data exchange between the network and the mobile.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

As discussed above, a shared random access packet data channel has distinct disadvantages in a digital radio telecommunication system when packet traffic is heavy and/or large quantities of data need to be sent. The system of the present invention provides an improved solution to this situation by specifying a dedicated packet data access scheme which has the capability of carrying larger amounts of packet traffic without breakdown.

The high capacity packet access scheme of the present invention is disclosed herein as an exemplary second access for a low capacity random access scheme. It should be understood that this improved scheme could be used as a stand alone mode as well.

Figure 7:
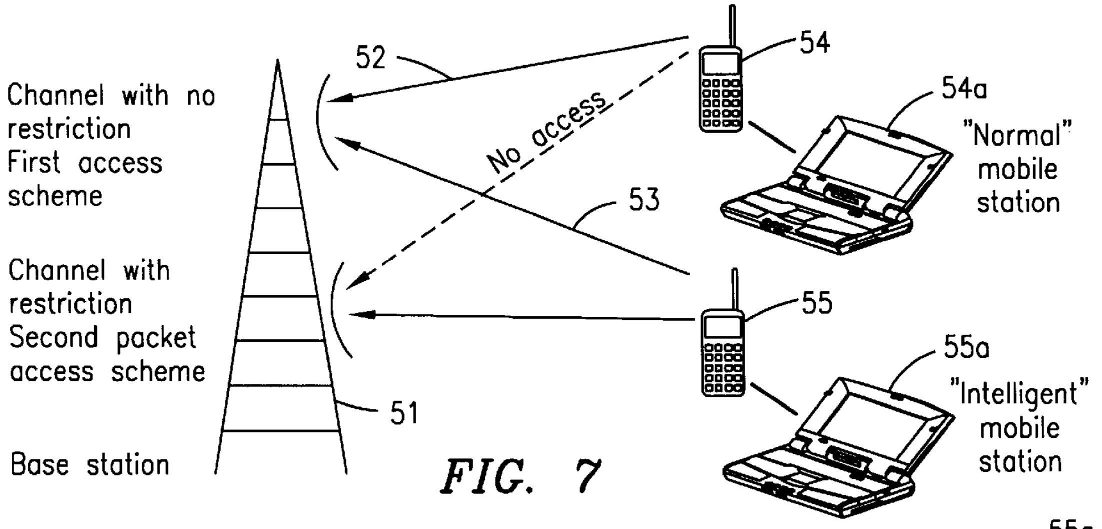
FIG. 7 is a pictorial diagram illustrating the addition of a separate parallel packet data access scheme within a digital cellular system having a random access packet data channel in accordance with the present invention.

As illustrated in FIG. 7, a base station 51 includes means for providing random access attempts 52 and 53 from a pair of mobile stations 54 and 55 each of which include, respectively, packet data access capabilities 54*a* and 55*a*. The BCCH contains an indication of which packet channels are available within the system. Access to the first access scheme by the respective mobile stations 54 and 55 is accomplished by random access contention by the two mobile stations in response to information on the downlink UPCH for the first access scheme. Mobile station 55 constructed in accordance with the present invention includes the capability of using both the first access scheme and a second dedicated packet access scheme which is constructed in accordance with the present invention. The first access scheme, available to both mobile stations 54 and 55, includes only random packet access. The second access scheme constructed in accordance with the present invention is, available to only mobile station 55 and is for dedicated packet traffic only. The mobile station 55 is, in effect, a dual mode mobile station having the capability of securing packet data access on either of the two schemes while the mobile station 54 only has the capability of access under the first random access scheme.

In the exemplary embodiment wherein the dedicated packet access scheme of the present invention is used as a second alternative packet access scheme with a first random access packet scheme, such that provided by the PDC standards, the control of access to the respective schemes is an important concern.

One exemplary way of administrating the control of access by only dual mode mobile stations is the following. As mentioned above, the existing PDC standard, for example, includes within the broadcast information message a channel restriction information parameter comprising one octet of data. Out of the 256 possible bit combinations only a very few are recognized by existing single mode mobiles and are currently used to restrict channel access by those mobiles. Other new combinations of bit patterns in the channel restriction parameter are used to indicate to the dual mode mobiles that they have access to the second access scheme and will be unrecognizable and ignored by the single mode mobiles.

Figure 8:
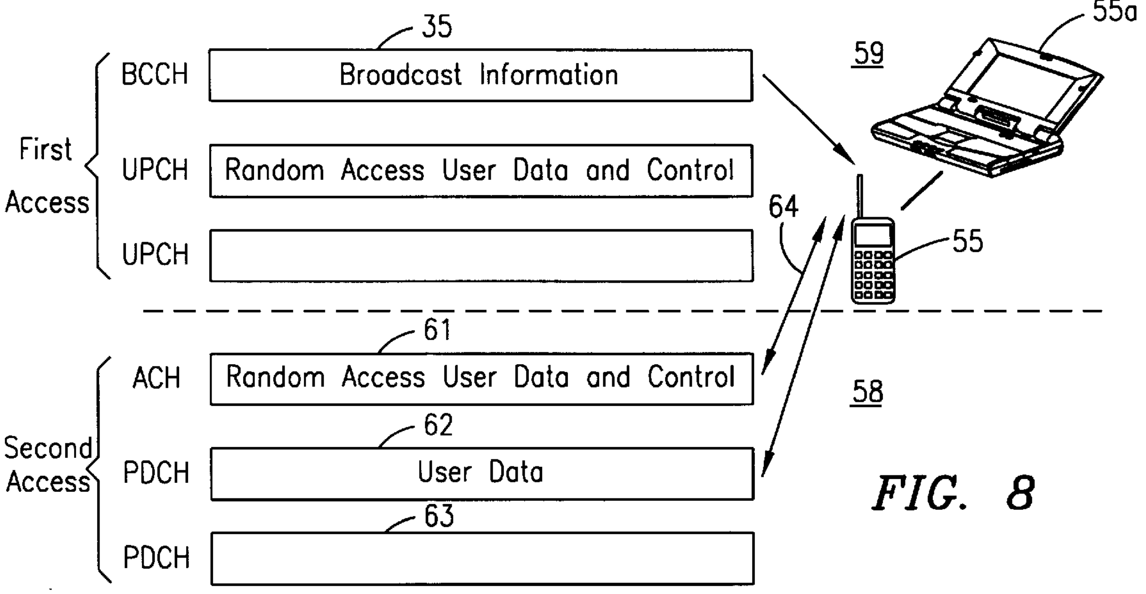
FIG. 8 is a pictorial diagram illustrating selective access of the separate parallel dedicated packet data channel in a system constructed in accordance with the teachings of the present invention.
Figure 9:
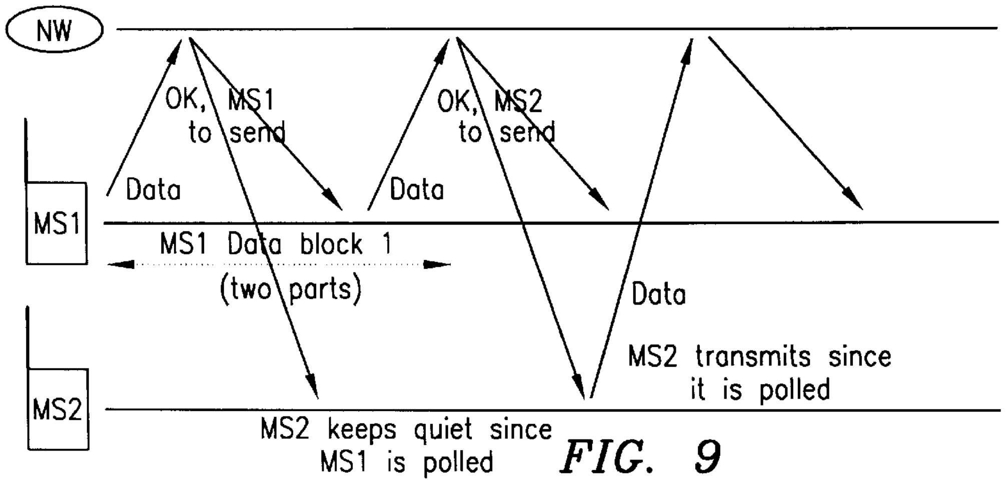
FIG. 9 is a pictorial diagram illustrating access to a parallel packet data access scheme incorporated into a network in accordance with the present invention.

Referring next to FIG. 8, there is shown a pictorial diagram illustrating the access scheme of the present invention as forming a second access of a multiple access scheme utilized by the dual mode mobile station 55. The packet access scheme 58 of the present invention consist of one channel of random access type 61 and a number of channels which use the polling principle of access. The random access channel 61 of the access scheme 58 comprises an access and control channel (ACH) which is used for control signaling and short data signals. Polling data channels (PDCH) 62 and 63 are used for larger quantities of data to be sent between the mobile station 55 and the network. Only the presence and the operative parameters of the random access channel (ACH) are communicated to the mobile station 55 on the BCCH 35; that is, the channel restriction information on the BCCH tells the single mode mobiles that this ACH is not available to them. A dual mode mobile station 55 which has a relatively large quantity of data to send to the network utilizes the present system by sending a data registration signal 64 on the ACH. The network can then dynamically allocate one or more polling data channels PDCHs 62 and 63 depending upon the quantity of data to be sent. The network also allocates one or more PDCHs when there is data to be sent to a mobile station. For the polling data channels, PDCHs, either a standard polling scheme, such as in accordance with one option of the high level datalink control (HDLC), for example, or a messaging scheme of the type set forth below may be used. The burst structure of the type described above in connection with FIGS. 5 and 6 contains an E field for the administration of collision control bits. In the access scheme of the present invention, however, the E field is replaced by flag patterns which are controlled by the network. Each pattern is associated with a specific mobile station and, when recognized, allows it to send its data to the network. The layer 1 uplink scheme of the present invention is illustrated in FIG. 9. The use of polling flags on the PDCH uses the same burst format as, but not the same content, as the use of the E-field bits in the random access channel.

Figure 1:
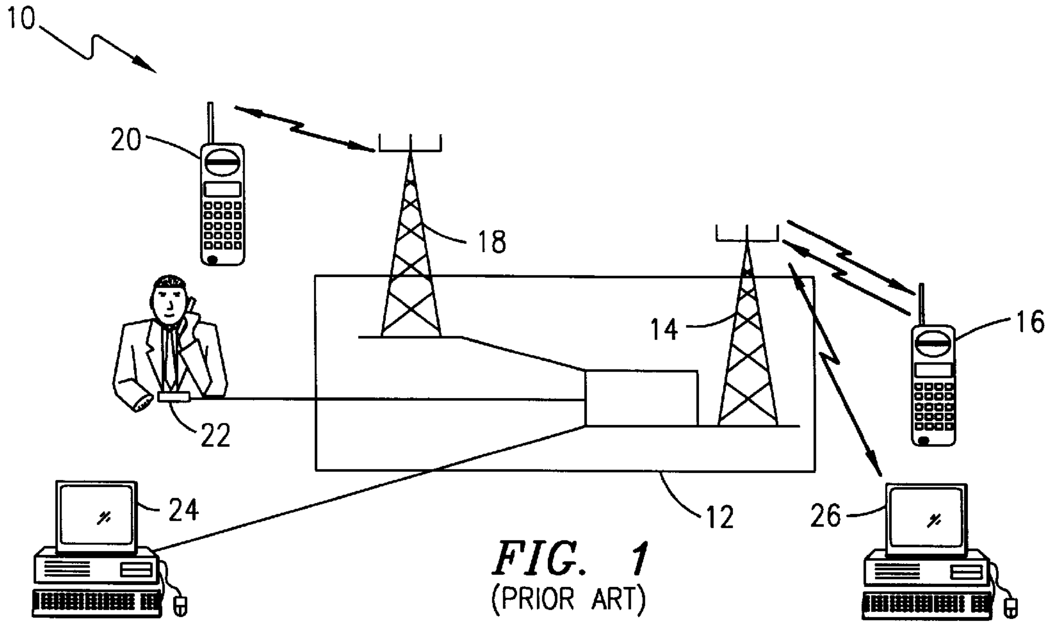
FIG. 1 is a pictorial block diagram illustrating a prior art radio telecommunications system.
Figure 2:
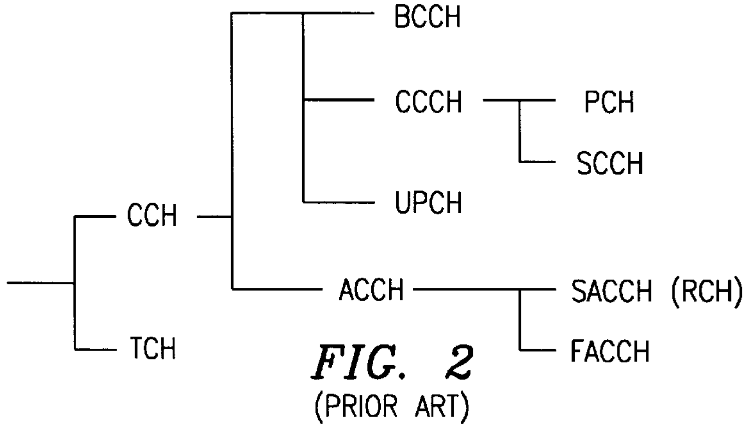
FIG. 2 is a diagram illustrating the radio channel structure within the air interface of an illustrative prior cellular system having a packet data channel.
Figure 3:
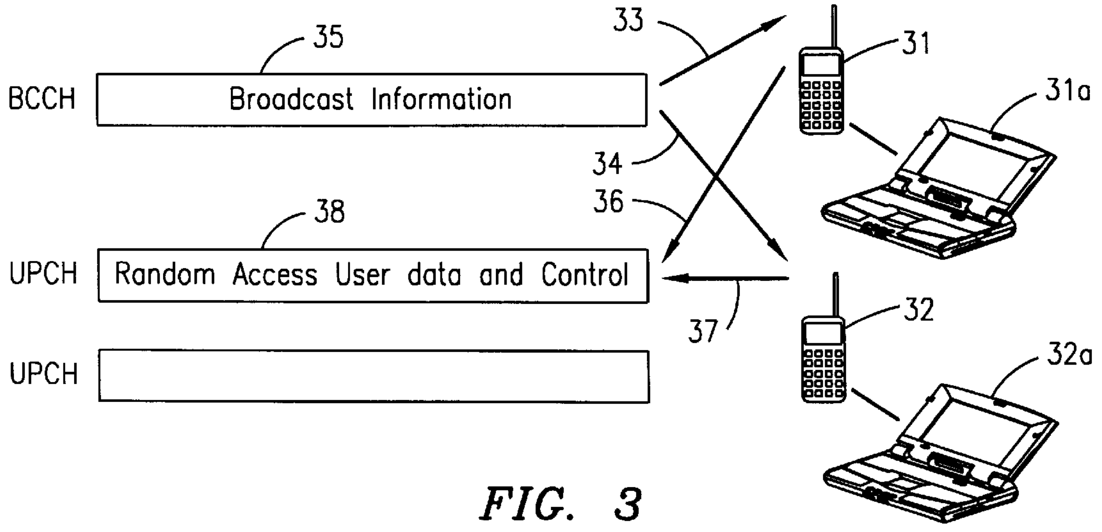
FIG. 3 is a diagram illustrating random access of a shared packet data channel in an illustrative prior art digital cellular system.
Figure 4:
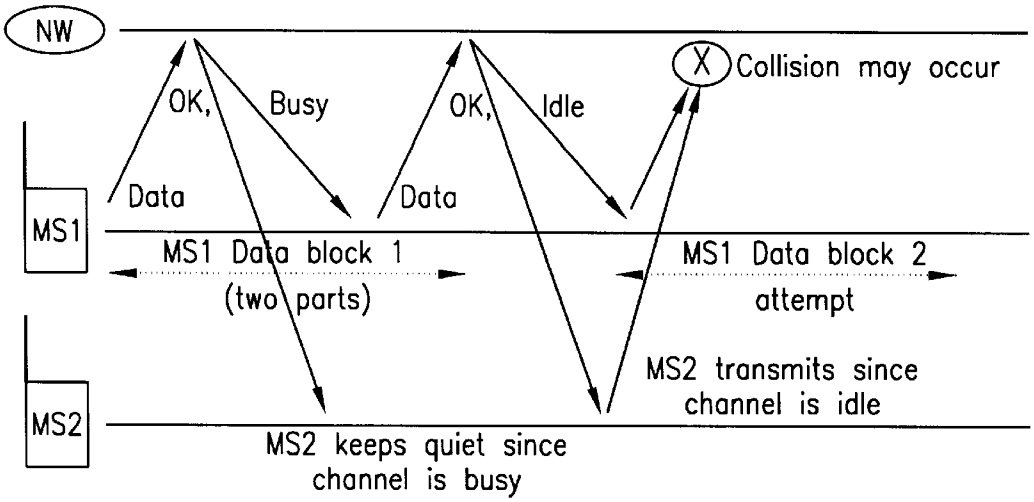
FIG. 4 is a pictorial diagram illustrating competition for a single random access packet data channel and possible collisions which may occur in a prior art system.
Figure 5:
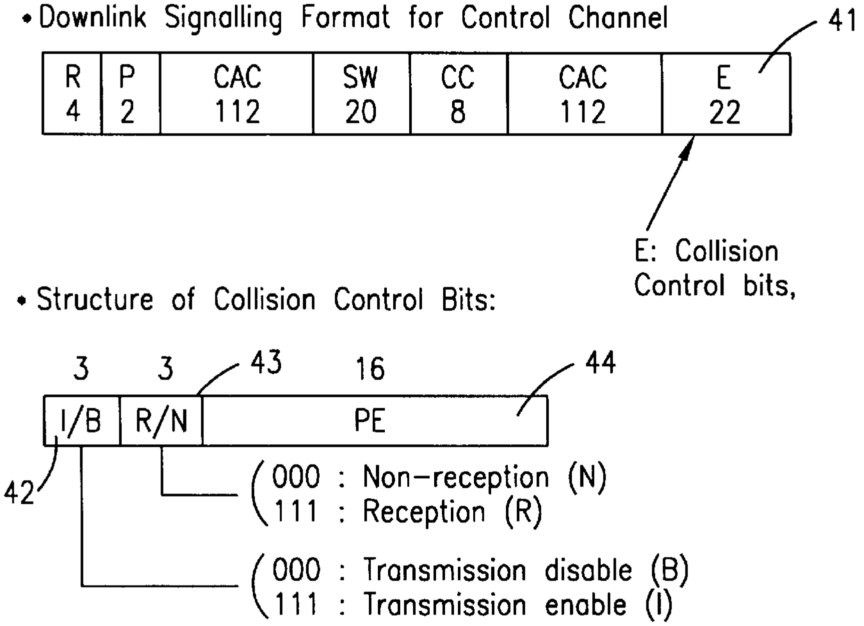
FIG. 5 is a diagram illustrating the downlink signaling format within a control channel of a prior digital cellular system illustrating collision control messaging.
Figure 6:
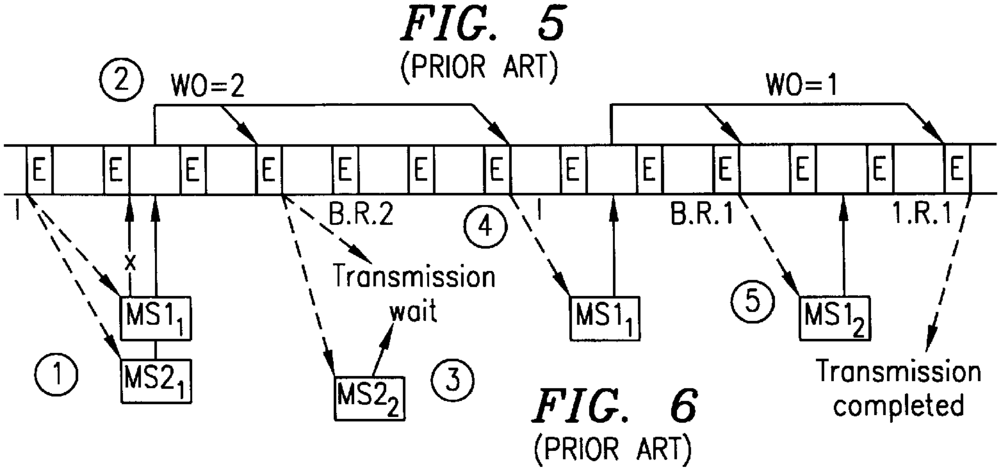
FIG. 6 is a diagram illustrating random access for communication by two separate mobile stations, both seeking random packet access to a base station in a prior art digital cellular system.

One goal in this exemplary embodiment of the packet access system of the present invention is to minimize the changes in the existing exemplary system necessary to implement the new system. For example, the existing downlink signaling format for the control channel is shown in FIG. 5 and discussed above. This format contains an E field which is 22 bits in length and which is used in the existing random access to control packet collisions. In the present invention, one first exemplary technique of controlling access by the various mobiles seeking access to the PDCH is to replace the collision control bits of the E field with a six bit “flag pattern” repeated 3 times (18 bits) for redundancy. This will give a maximum number of 64 possible combinations. When a dual mode mobile registers with the system on the ACH to obtain access for sending data packets on the PDCH it is assigned one particular flag pattern. That mobile may only send data after it recognizes its own flag pattern as having been broadcast by the network over the PDCH on the downlink indicating that mobile’s turn to send packets to the network on the uplink PDCH. For example, a mobile which has recognized its unique flag pattern in the E field may, 190 symbols after the interface between the syncword and color code broadcast by the network, start sending burst and continue for up to 18 bursts in a single layer 2 message. Thereafter, the network resumes control and sends the flag pattern of a different mobile on the downlink PDCH in the E field giving a different mobile the opportunity to send packets. PDCH channels may also be allocated to various mobile stations as a function of the amount of data that each has to send to the network. The allocation of a specific time to send packets to each mobile means that there will be no collisions on the PDCH. The present system allows the same burst format to be used on both the existing random access packet channel and the dedicated PDCH of the present invention. This technique of the first exemplary embodiment described above greatly enhances the efficiency of packet data access in a system over both the purely random access system as well as GSM-like systems which offer a mobile the opportunity to continue to maintain ownership of the packet channel (by continuing to request ownership after sending repeated units of packet data). The system of the present invention provides a much fairer allocation of packet data resources to all the mobiles in the system.

Figure 10:
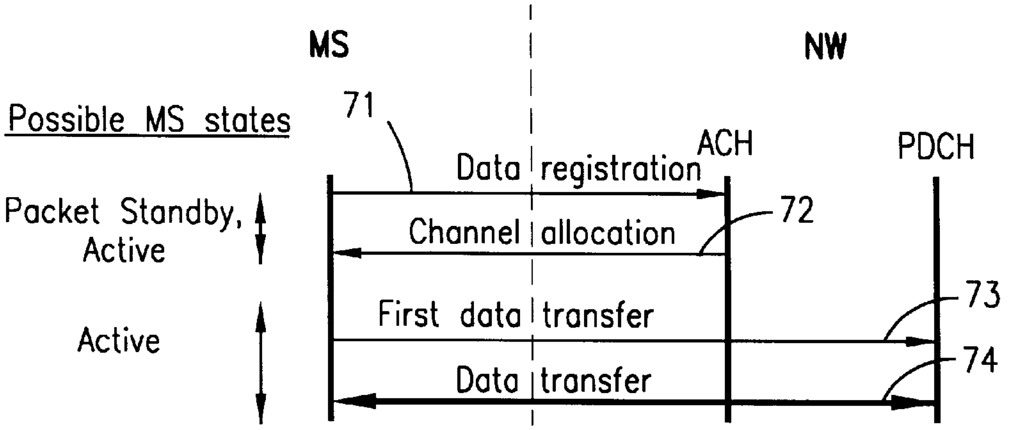
FIG. 10 is a signaling diagram illustrating large quantity data transfer initiated by a mobile station in a system constructed in accordance with the present invention.
Figure 11:
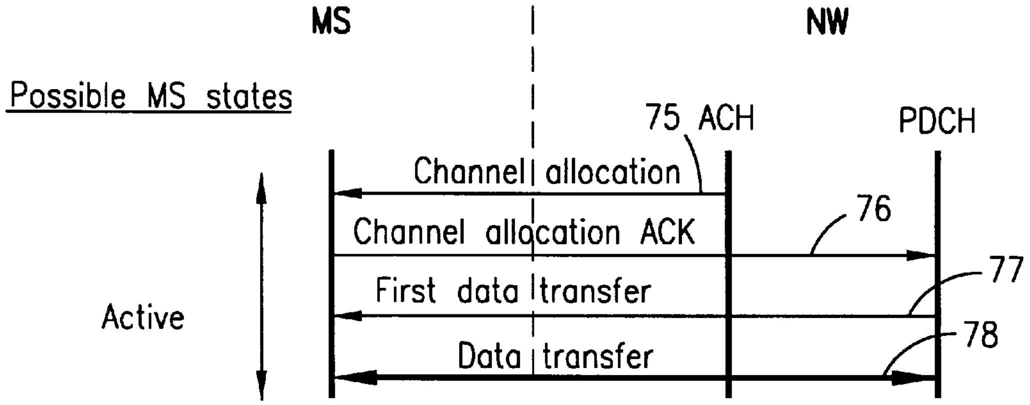
FIG. 11 is a signaling diagram illustrating large quantities of data transfer initiated by the network when a mobile station is in active state in a system constructed in accordance with the present invention.
Figure 12:
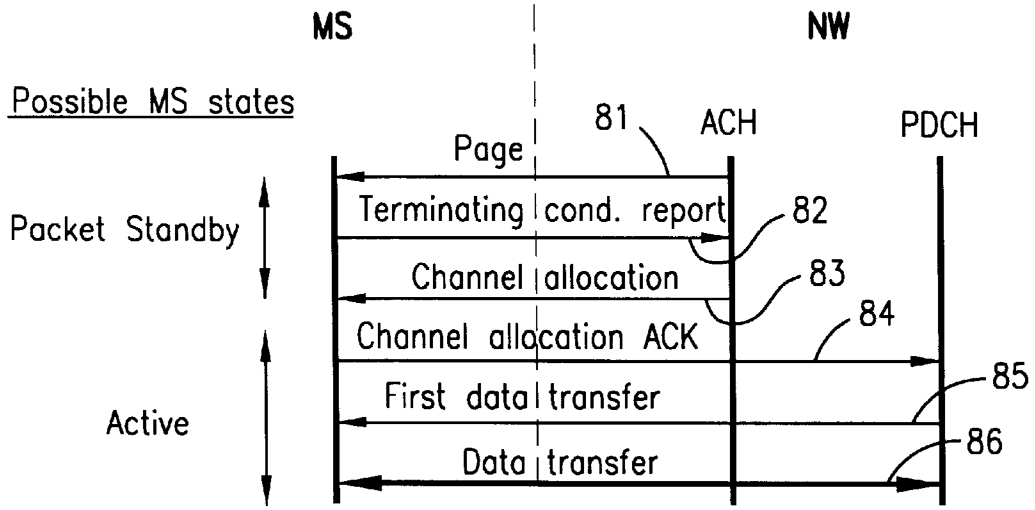
FIG. 12 is a signaling diagram illustrating large quantities of data transfer initiated by the network when a mobile station is initially in a packet standby state in a system constructed in accordance with the present invention.

As shown in FIGS. 10–12, there are a number of different traffic situations wherein the messaging scheme outline should be used. For example, in FIG. 10 there illustrates a situation in which transfer of a large quantity of data is to be initiated by the mobile station. First, the mobile station (MS) sends a data registration message 71 to the network (NW) on the random access channel (ACH). Thereafter, the network sends a channel allocation message 72 back to the mobile station which then enters the active mode and performs a first data transfer 73 from the mobile station to the network via the polling data channel (PDCH). Thereafter, multiple units, each comprising large quantities of data 74 may be transferred in both directions between the mobile station and the network.

Similarly, FIG. 11 illustrates large quantities of data transfer initiated by the network when the mobile station is in active state. In this instance, the network issues a channel allocation message 75 on the random access channel (ACH) to the mobile station which transmits a channel allocation acknowledgment (ACK) 76 on the packet data channel (PDCH) to the network. A first data transfer 77 takes place on the PDCH from the network to the mobile station and thereafter large quantities of data transfer 78 take place in both directions between the mobile station and the network on the PDCH.

Finally, FIG. 12 illustrates large quantities of data transfer initiated by the network when the mobile station is in a packet standby state wherein, in order to save power, the mobile listens less frequently to messages sent by the network. In this instance, a page message 81 is sent on the random access (ACH channel) from the network to the mobile station and the mobile responds with a terminating condition report message 82 on the ACH. The network responds with a channel allocation message 83 to the mobile station who forwards a channel allocation acknowledgment 84 on the PDCH back to the network. A first data transfer 85 takes place on the PDCH from the network to the mobile station followed by large quantity data transfers 86 in both directions between the mobile station and the network. Minimal change to existing standards, such as PDC, are required to implement the system of the present invention.

The availability of access by mobile stations to the access scheme of the present invention may be controlled by channel restriction information element, i.e. a parameter, included, for example, within the layer 3 downlink messages called “Broadcast Information,” “Zone Information Notification,” and “Packet System Information” within the PDC standard used herein in combination with an exemplary embodiment of the invention. This parameter is presently used in PDC to prevent too many mobile stations from using one specific random access channel. This parameter may be assigned a value which prevents mobile stations which do not have the capability to communicate on the random access and polling scheme of the present invention from being able to access it. Dual mode mobile stations may be attracted to the access scheme of the invention by selected values of the same parameters used to evaluate non-dual mode mobiles from access or by the receipt of information over the BCCH channel which indicates, for example, the number of collisions which are currently occurring on another purely random access scheme open to all mobiles.

The present invention enhances the facility of the existing radio telecommunications networks by adding increased capacity on several bases: (1) no collisions will occur on the polling channels (PDCHs) giving superior packet transfer behavior at medium and high traffic loads within the network; (2) the messages sent on the access channel (ACH) will be very short (with no or only very limited data transmissions) which also decreases the probability of collision between dual mode mobiles accessing this alternative channel; and (3) the polling data channels (PDCHs) are dynamically allocated for usage by the mobile stations according to the amount of data to be transmitted.

The method and system of the present invention also allows a flexible assignment of available packet data resources for each cell. In low traffic cells a single random access packet data channel scheme may be preferred because of lower cost. However, for higher traffic densities, either in numbers of mobiles seeking access for packet data transmission or the larger quantities of data to be sent between mobile stations and the network, a base station which supports both access schemes is considerably more efficient. The provision of the additional access channels may be made by changing the set up parameters for the channels within a cell. The currently available channel structure within each cell is communicated to the mobile stations through normal broadcast procedures.

Although preferred embodiments of the method and apparatus of the present invention have been illustrated in the accompanying drawings and described in the foregoing description, it is understood that the invention is not limited to the embodiment(s) disclosed but it capable of numerous rearrangements, modifications and substitutions without departing from the spirit of the invention as set forth and defined in the following claims.

What is claimed is:

1. A method for providing a packet data access scheme in a digital cellular communications network which comprises:

providing a broadcast control channel (BCCH) over which the network broadcasts control information to mobile stations in the network;

providing a random access channel (ACH) over which the network communicates only control signaling and short data messages between mobile stations and the network;

providing at least one polling data channel (PDCH) over which the network communicates larger quantities of packet data between a mobile station and the network, said at least one PDCH providing dedicated access between said mobile station and the network;

broadcasting messages over said broadcast control channel (BCCH) which indicate the presence and operative parameters of said random access and polling channels to said mobile stations, at least one of said messages including a channel restriction information parameter limiting access of said at least one PDCH to a subset of said mobile stations;

receiving a data registration signal from a mobile station of said subset of said mobile stations on the ACH channel to indicate that said mobile station has data to send to the network over said at least one PDCH, said mobile station recognizing from said channel restriction information parameter that said mobile station is allowed access to said at least one PDCH; and allocating within the network said at least one PDCH to said mobile station to allow said mobile station to send its data to the network.

2. A method for providing a packet data access scheme in a digital cellular communications network as set forth in claim 1 which also includes:

broadcasting control messages over the downlink of said at least one PDCH, at least one of said control messages including a control flag pattern which indicates that a particular mobile station is allowed to send data over the uplink of said at least one PDCH at that time.

3. A method for providing a packet data access scheme in a digital cellular communications network as set forth in claim 2 which also includes:

allowing said particular mobile station which recognizes its associated control flag pattern in one of said control messages to send a number of bursts of packet data to the network on the uplink of said at least one PDCH and then, broadcasting from the network a different control message with a different control flag pattern associated with a different mobile station allowing said different mobile station to send packet data bursts to the network.

4. A method for providing a packet data access scheme in a digital cellular communications network as set forth in claim 3 wherein the control flag pattern of each mobile station which is registered with the network is sequentially broadcast within a corresponding one of said control messages so that each registered mobile station is given an approximately equal share of time on the uplink of said at least one PDCH to send its data to the network.

5. A method for providing a packet data access scheme in a digital cellular communications network as set forth in claim 3 wherein said packet data access scheme is used in conjunction with an existing random packet access scheme and employs a similar burst format on both schemes.

6. A method for providing a packet data access scheme in a digital cellular communications network as set forth in claim 3 wherein said packet data access scheme provides dedicated packet access and is used in conjunction with an existing random packet access scheme which includes messages containing a collision control field having collision control bits and wherein the dedicated packet data access scheme maintains a similar general message format as said existing random packet access scheme and sends its control flag pattern bits in said collision control field having said collision control bits in said existing random packet access scheme.

7. A method for providing a packet data access scheme in a digital cellular communications network as set forth in claim 2 wherein:

said control flag pattern comprises a six bit data pattern repeated three times for redundancy.

8. A method for providing a packet data access scheme in a digital cellular communications network as set forth in claim 1 which also includes:

dynamically allocating said at least one PDCH to mobile stations of said subset of mobile stations as a function of the amount of data that each mobile station of said subset of mobile stations has to send to the network.

9. A method for providing a packet data access scheme for use in a digital cellular communications network which includes:

providing a broadcast control channel (BCCH) over which the network broadcasts control information to mobile stations in the network;

providing a random access channel (ACH) over which the network communicates only control signaling and short data messages between mobile stations and the network;

providing at least one polling data channel (PDCH) over which the network communicates larger quantities of data between a mobile station and the network;

broadcasting messages over said broadcast control channel (BCCH) which indicate the presence and operative parameters of said random access and polling channels to said mobile stations;

broadcasting a control message which includes a channel restriction information parameter limiting access of a packet data access scheme providing dedicated access to a subset of said mobile stations, each mobile station of said subset recognizing from said channel restriction information parameter that said each mobile station is allowed access to said packet data access scheme;

sending on said ACH channel a message from the network to a selected mobile station indicating that the network has data to send to said selected mobile station, said message including an allocated PDCH;

sending a channel allocation acknowledgment on said allocated PDCH channel from said selected mobile station to the network indicating that said selected mobile station is ready to receive data from the network; and sending data packets between the network and said selected mobile station over said allocated PDCH channel.

10. A method for providing a packet data access scheme in a digital cellular communications network as set forth in claim 9 wherein said selected mobile station is initially in a packet standby state which also includes the additional steps of:

paging said selected mobile station, and obtaining a terminating condition report from said selected mobile station prior to sending a PDCH allocation message from the network to said selected mobile station.

11. A system for providing a packet data access scheme for use in a digital cellular communications network which comprises:

means for providing a broadcast control channel (BCCH) over which the network broadcasts control information to mobile stations in packet data mode;

means for providing a random access channel (ACH) over which the network communicates only control signaling and short data messages between a subset of mobile stations and the network;

means for providing at least one polling data channel (PDCH) over which the network communicates larger quantities of data between a mobile station and the network, said at least one PDCH providing dedicated access between said mobile station and the network;

means for broadcasting messages over said broadcast control channel (BCCH) which indicate the presence and operative parameters of said random access and polling channels to said mobile stations, at least one of said messages including a channel restriction information parameter limiting access of said at least one PDCH to said subset of said mobile stations;

means for receiving a data registration signal from a mobile station of said subset of mobile stations on the ACH channel to indicate that said mobile station has data to send to the network over said at least one PDCH, said mobile station recognizing from said channel restriction information parameter that said mobile station is allowed access to said at least one PDCH; and means for allocating said at least one PDCH to said mobile station to allow said mobile station to send its data to the network.

12. A system for providing a packet data access scheme in a digital cellular communications network as set forth in claim 11 which also includes:

means for broadcasting control messages over the downlink of said at least one PDCH, at least one of said control messages including a control flat pattern which indicates that a particular mobile station is allowed to send data over the uplink of said at least one PDCH at that time.

13. A system for providing a packet data access scheme in a digital cellular communications network as set forth in claim 12 which also includes:

means for allowing said particular mobile station which recognizes its associated control flag pattern in one of said control messages to send a number of bursts of packet data to the network on the uplink of said at least one PDCH and then, means for broadcasting from the network a different control message with a different control flag pattern associated with a different mobile station allowing said different mobile station to send packet data bursts to the network.

14. A system for providing a packet data access scheme in a digital cellular communications network as set forth in claim 13 wherein the control flag pattern of each mobile station which is registered with the network is sequentially broadcast within a corresponding one of said control messages so that each registered mobile station of said subset of mobile stations is given an approximately equal share of time on the uplink of said at least one PDCH to send its data to the network.

15. A system for providing a packet data access scheme in a digital cellular communications network as set forth in claim 13 wherein said packet data access scheme is used in conjunction with an existing random packet access scheme and employs a similar burst format on both schemes.

16. A system for providing a packet data access scheme in a digital cellular communications network as set forth in claim 13 wherein said packet data access scheme provides dedicated packet access and is used in conjunction with an existing random packet access scheme which includes messages containing a collision control field having collision control bits and wherein the dedicated packet data access scheme maintains a similar general message format as said existing random packet access scheme and sends its control flag pattern bits in said collision control field having said collision control bits in said existing random packet access scheme.

17. A system for providing a packet data access scheme in a digital cellular communications network as set forth in claim 12 wherein:

said control flag pattern comprises a six bit data pattern repeated three times for redundancy.

18. A system for providing a packet data access in a digital cellular communications network as set forth in claim 11 which also includes:

means for dynamically allocating said at least one PDCH to mobile stations of said subset of mobile stations depending upon the amount of data that each mobile station of said subset of mobile stations has to send to the network.

19. A system for providing a packet data access scheme for use in a digital cellular communications network which includes:

means for providing a broadcast control channel (BCCH) over which the network broadcasts control information to mobile stations in the network;

means for providing a random access channel (ACH) over which the network communicates only control signaling and short data messages between a subset of mobile stations and the network;

means for providing at least one polling data channel (PDCH) over which the network communicates larger quantities of data between a mobile station and the network;

means for broadcasting messages over said broadcast control channel (BCCH) which indicate the presence and operative parameters of said random access and polling channels to said mobile stations;

means for broadcasting a control message which includes a channel restriction information parameter limiting access of a packet data access scheme providing dedicated access to said subset of said mobile stations, each mobile station of said subset recognizing from said channel restriction information parameter that said each mobile station is allowed access to said packet data access scheme;

means for sending on said ACH a message from the network to a selected mobile station indicating that the network has data to send to said selected mobile station, said message including an allocated PDCH;

means for sending a channel allocation acknowledgment on said allocated PDCH from said selected mobile station to said network indicating that said selected mobile station is ready to receive data from the network; and means for sending data packets between the network and said selected mobile station over said allocated PDCH.

20. A system for providing a packet data access scheme in a digital cellular communications network as set forth in claim 19 wherein said selected mobile station is initially in a packet standby state which also includes:

means for paging said selected mobile station, and means for obtaining a terminating condition report from said selected mobile station prior to sending a PDCH allocation message from the network to said selected mobile station.

* * * * *

UNITED STATES PATENT AND TRADEMARK OFFICE

CERTIFICATE OF CORRECTION

PATENT NO : 6,038,223

DATED : March 14, 2000

INVENTOR(S) : Hansson et al

It is certified that error appears in the above-identified patent and that said Letters Patent are hereby corrected as shown below:

Column 12, line 19 Replace "flat"
With --flag--

Signed and Sealed this

Seventeenth Day of April, 2001

Attest:

NICHOLAS P. GODICI

*Attesting Officer* *Acting Director of the United States Patent and Trademark Office*